United States Patent [19]
Williams et al.

[11] Patent Number: 4,611,348
[45] Date of Patent: Sep. 9, 1986

[54] APPARATUS FOR ALTERING THE SPATIAL CHARACTERISTICS OF A DIGITAL IMAGE BY POLYNOMIAL INTERPRETATION USING SETS OF ARITHMETIC PROCESSORS

[75] Inventors: Eugene C. Williams, Waukesha; Phil E. Pearson, Jr., Milwaukee, both of Wis.

[73] Assignee: General Electric Company, Milwaukee, Wis.

[21] Appl. No.: 675,056

[22] Filed: Nov. 26, 1984

[51] Int. Cl.⁴ .............................................. G06F 3/14
[52] U.S. Cl. ..................................................... 382/44
[58] Field of Search ........................ 382/44, 45, 46, 47

[56] References Cited

U.S. PATENT DOCUMENTS 4,283,765  8/1981  Rieger .................................... 382/47
4,381,547  4/1983  Ejiri ....................................... 382/47

Primary Examiner—Stephen A. Kreitman
Attorney, Agent, or Firm—Flehr, Hohbach, Test, Albritton & Herbert

[57] ABSTRACT

A set of two processors operates on image pixel data using polynomial interpolation to generate pixel data for a spatially varied image. Image data is first stored in a buffer memory, and constants used in the polynomial interpolation are stored in a constants memory. One processor operates on the data from the buffer memory using constants from the constants memory, and the interpolated data is then stored in a display memory. The second processor controls the interpolation process by addressing the memories for the retrieval and storage of data.

8 Claims, 4 Drawing Figures

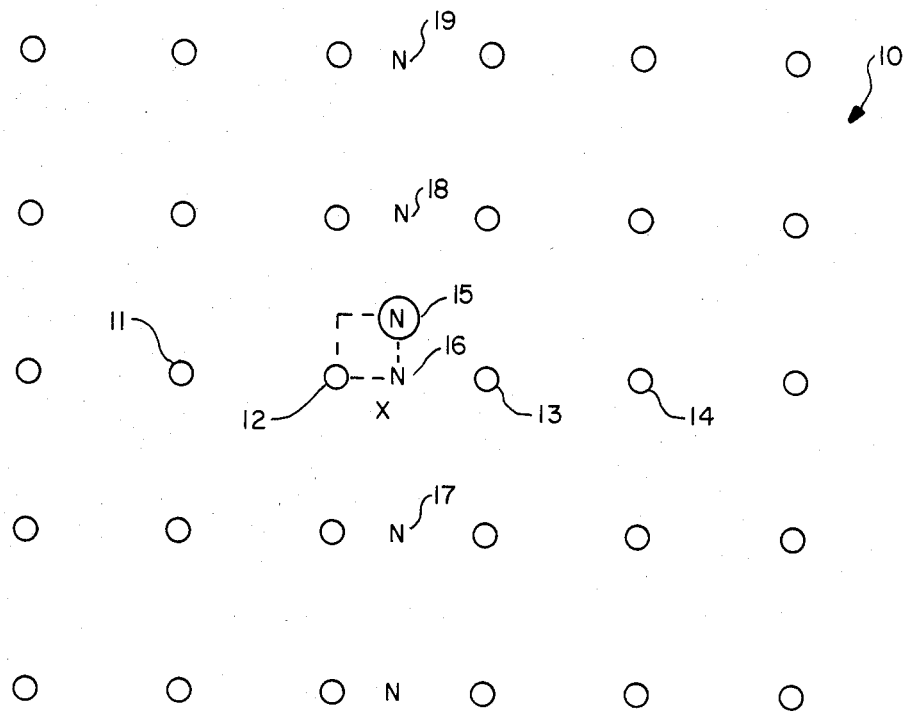
FIG.—1
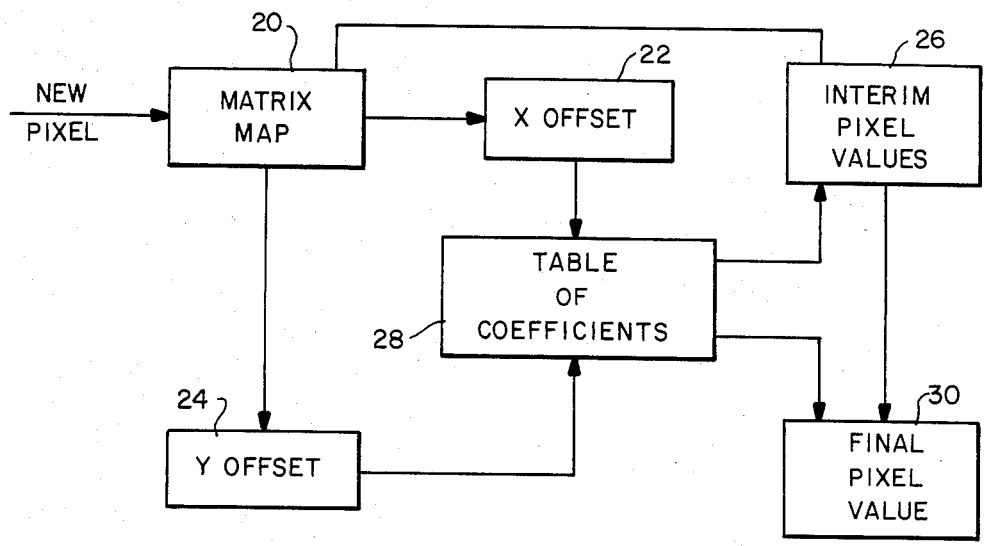
FIG.—2

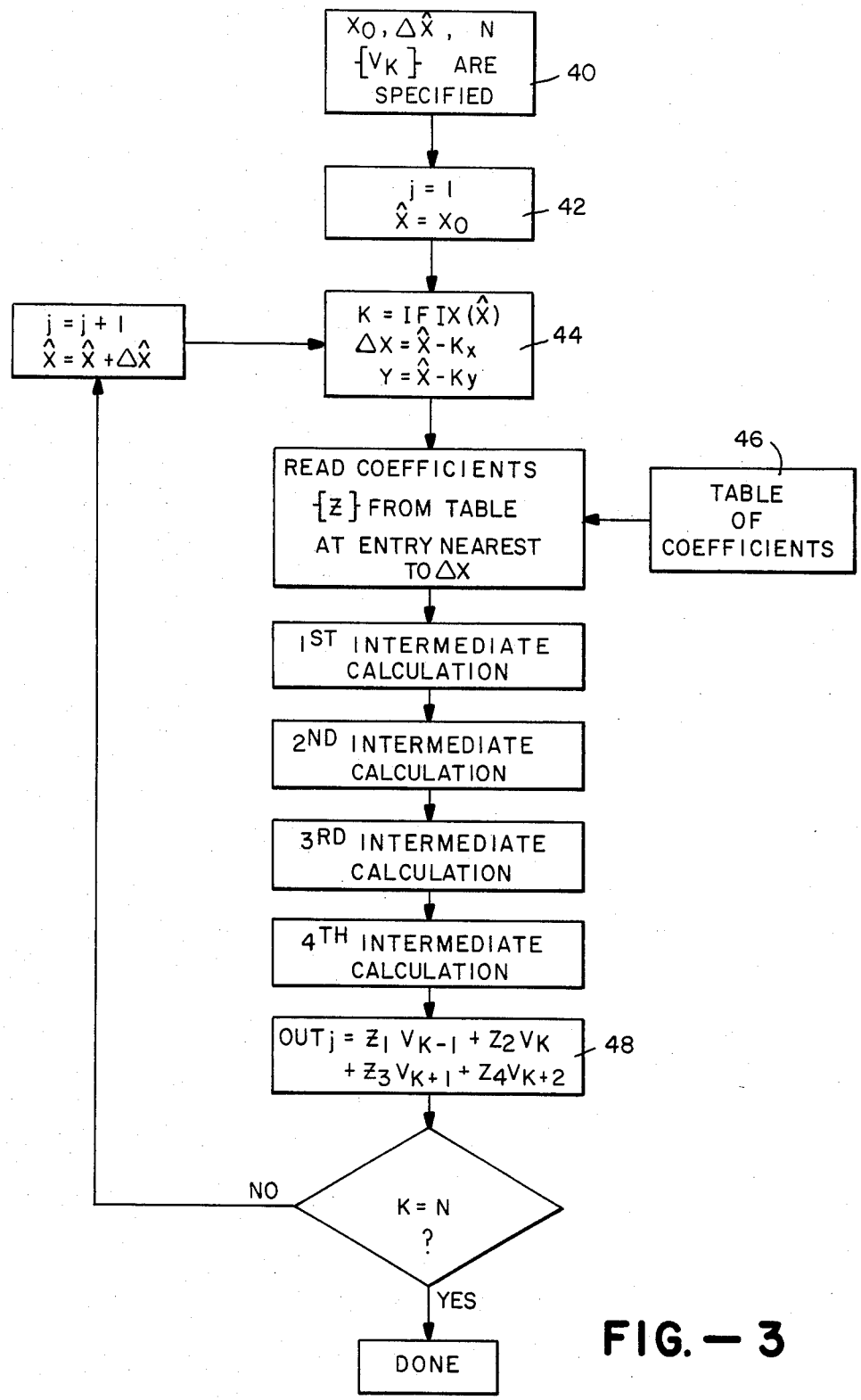
FIG.—3

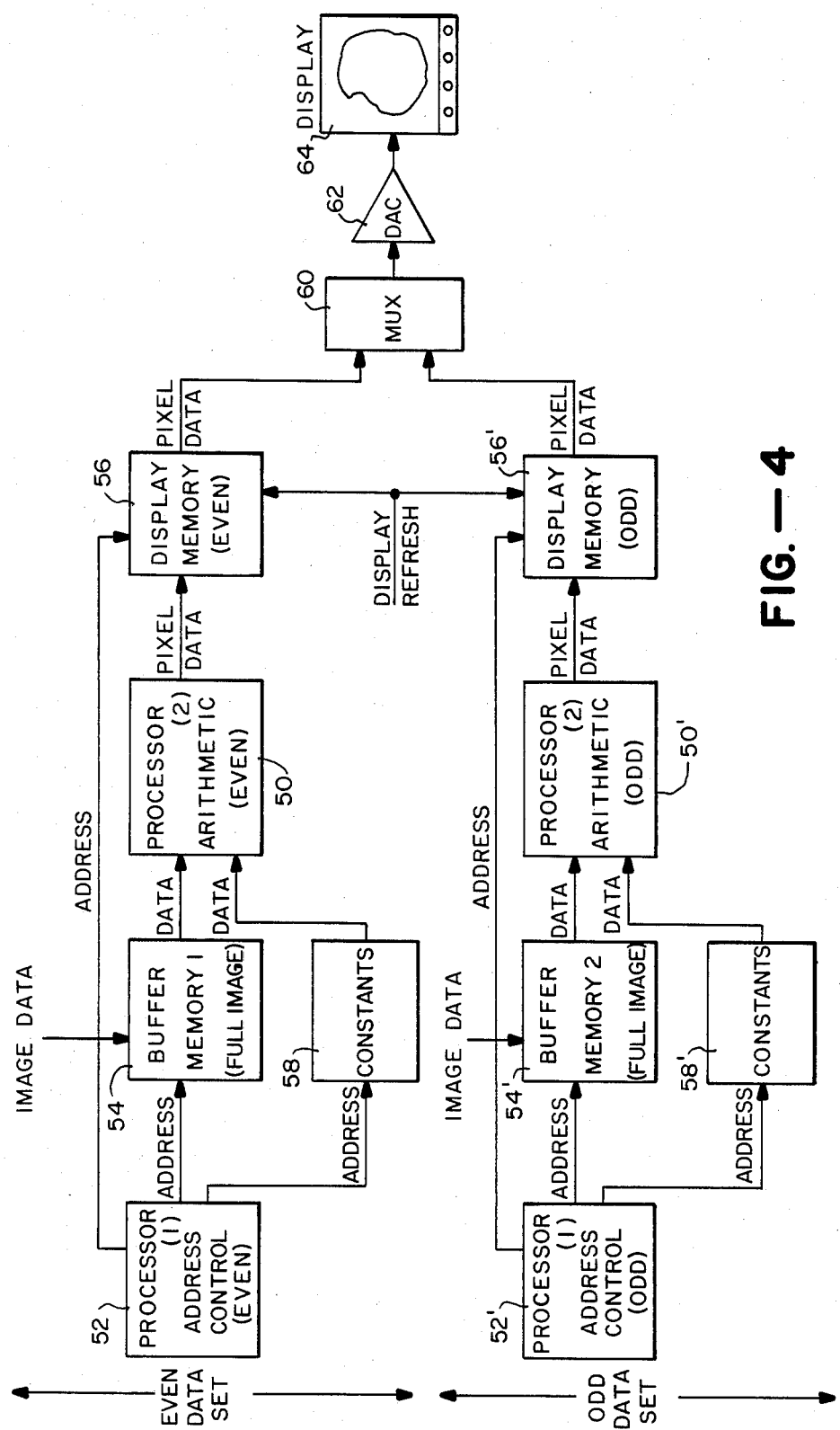
FIG.—4

APPARATUS FOR ALTERING THE SPATIAL CHARACTERISTICS OF A DIGITAL IMAGE BY POLYNOMIAL INTERPRETATION USING SETS OF ARITHMETIC PROCESSORS

This invention relates generally to the display of digital images and more particularly the invention relates to an improved means for establishing new pixel values for new pixel locations from an image having established pixel locations and values. The new pixel locations could be chosen, for example, to magnify, minify, translate or distort the original image.

The display of a digital image, for example on a video screen or photographic film, is controlled by a memory which stores values for picture elements or pixels. In a video display, an electron beam is scanned across the phosphor-coated surface of the display screen, and the current of the electron beam is controlled in accordance with the stored values to thus control the light intensity of each pixel element as the electron beam impinges on the phosphor material. Alternatively, the digital image can be transferred to photographic film by scanning a laser beam across the film and modulating the intensity of the laser beam in accordance with the stored pixel values.

In any of the image processing tasks mentioned above, values for pixels at locations different than the original pixel locations must be derived. The simplest technique for doing this is to use, for each output pixel, the value of the nearest input pixel. Minification is then performed by selectively deleting pixels while to magnify some or all of the pixel values are replicated. The resulting image quality is often not satisfactory. Values for the new pixel locations can be arrived at using linear interpolation in both directions. However, images magnified using this method are blurry and structured noise is sometimes visible.

Improved fidelity and sharpness can be realized if the interpolation of new pixel values is a higher order polynomial interpolation. For example, in a third order interpolation of a pixel value in a new matrix to be described, the values of sixteen adjacent pixels in the old matrix are used. Generally, the higher the order of the polynomial used, the more fidelity and sharpness the new image will have. However, as the order of the polynomial interpolation increases, more computations are required in determining the new pixel values.

Disclosed in copending application Ser. No. 672,609 filed Nov. 19, 1984, is an efficient method and apparatus for implementing polynomial interpolation of pixel values in a new matrix using pixel values of an old matrix. The polynomial interpolation is implemented by a weighted combination of the input pixels. A table of coefficients for the polynomial interpolation of pixel values in a new matrix is employed which is based on one dimensional (e.g., x or y) incremental spacing from pixels in an old matrix.

Briefly, the pixels in the new pixel matrix are mapped in the old pixel matrix to obtain x and y offsets from old pixels. The offset for each new pixel in one dimension (e.g., x dimension) is determined and values for interim pixels are interpolated or obtained using values of a plurality of old pixels adjacent to each new pixel in the one dimension. The final pixel values are then obtained by polynomial interpolation in the other dimension (e.g., y dimension) using the calculated values of interim pixels. Importantly, the weighting coefficients for the one dimensional interpolations are precalculated for given incremental values. Thus, the time consuming tasks of calculating polynomial coefficients and evaluating polynomials are not required during the calculation of new pixel values.

The present invention is directed to apparatus for implementing high speed image calculations necessary for higher order polynomial interpolation such as disclosed in copending application Ser. No. 672,609, supra. The apparatus includes sets of arithmetic processors which operate in parallel in executing identical algorithms for assigned pixels of an image. Each set includes a first processor and a second processor. The first processor performs the arithmetic manipulation of the pixel data in calculating the final pixel values. The second processor is assigned the tasks of addressing source image data, addressing destination image data, calculating weighting constants to be used by the first processor, and functioning as system controller for the image interpolation.

The multiprocessor sets can be expanded to include any number of processors operating in parallel on assigned pixels. In one embodiment using two multiprocessor sets for odd and even pixel locations, respectively, image interpolation was up to forty times faster than image interpolation using a single main frame computer.

The invention and objects and features thereof will be more readily apparent from the following detailed drawings, in which:

FIG. 1 is an illustration of a portion of a matrix of known pixel values and a matrix of pixels whose values are to be calculated.

FIG. 2 is a functional block diagram of computer apparatus for determining new pixel values using higher order polynomial interpolation.

FIG. 3 is a program flow diagram for calculating new pixel values using higher order polynomial interpolation.

FIG. 4 is a schematic diagram of one embodiment of apparatus to carrying out the order in accordance with the present invention.

FIGS. 1-3 illustrate the method of high speed image calculation for higher order polynomial interpolation disclosed in copending application Ser. No. 672,609, supra.

FIG. 1 illustrates a portion of a matrix 10 of pixels of known value such as the pixels 11, 12, 13 and 14 in one horizontal row of the matrix. Assume that a new matrix of pixels is mapped on the old matrix 10 and the new pixel 15 is in the new matrix. As illustrated, the pixel 15 is offset from pixel 12 by a horizontal distance, x, and a vertical distance, y.

In general, the value of a new pixel 15 is arrived at by treating the region of the image in the neighborhood of pixel 15 as some function f (x,y) the details of which depend on the values of neighboring pixels. The value assigned to pixel 15 is then the value of the function f (x,y) at the position of pixel 15. This process is repeated for all the output pixels to arrive at the interpolated image. In polynomial interpolation, the function f (x,y) is a polynomial function of x and y. The process of calculating the output pixel value then involves calculating the polynomial coefficients using input pixels neighboring the output pixel and then evaluating the polynomial. Typically, the number of input pixels used is equal to the number of polynomial coefficients of f (x,y) that must be determined. For example, suppose we wish to use as a model the polynomial:

$$f(x,y) = a_0 + a_1 + a_2 x^2 + a_3 y + a_4 y^2 + a_5 xy + a_6 x^2 y + a_7 xy^2 + a_8 x^2 y^2 \quad (1)$$

Suppose we want to compute the value for a pixel to be located at $(\hat{x}, \hat{y})$. Coefficients $a_0, a_1 \ldots a_8$ such that $f(x,y)$ exactly matches the values of nine input pixels surrounding $(\hat{x},\hat{y})$ are calculated.

For the model of Equation 1 this is done by solving a system of nine equations (one for each input pixel) with nine unknowns (the coefficients). The coefficients are then used to calculate the output pixel value:

$$f(\hat{x},\hat{y}) = a_0 + a_1 \hat{x} + a_2 \hat{x}^2 + a_3 \hat{y} + a_4 \hat{y}^2 + a_5 \hat{x}\hat{y} + a_6 \hat{x}^2 \hat{y} + a_7 \hat{x}\hat{y}^2 + a_8 \hat{x}^2 \hat{y}^2 \quad (2)$$

If the two dimensional polynomial model contains all terms up to nth order in either variable, where n is any integer, then the two dimensional interpolation process can be broken down into one-dimensional interpolations. For example, the first step would interpolate in the x direction and arrive at interim pixel values for pixels $(\hat{x}, y_e)$ where $y_e$ takes on the values of y for rows neighboring the desired output pixel. Then, an interpolation in y is used, using the interim pixel values as inputs, to compute the output pixel value for the desired pixel at $(\hat{x}, \hat{y})$. It will now be shown that for polynomials that include terms to nth order in either coordinate the two dimensional interpolation can be simplified into two one-dimensional interpolation steps. The polynomial model we use is:

$$f(x, y) = \sum_{i=0}^{\eta} \sum_{j=0}^{\eta} a_{ij} x^i y^j \quad (3)$$

In a $(n+1)$ square array of pixels surrounding the desired output location (x, y) x will take on values $\{x_0, x_1, \ldots, x_n\}$ while y will take on values $y_0, y_1 \ldots, y_n$. Let $v(x_k, y_l)$ be the value for the pixel at $(x_k, y_e)$. We need to arrive at a value for a new pixel at $(\hat{x}, \hat{y})$. The classical way to do this is to generate a set of coefficients $\{a_{i,j}\}$ such that $$\sum_{i=0}^{\eta} \sum_{j=0}^{\eta} a_{ij} x_k^i y_e^j = v(x_k, y_e) \quad (4)$$

is true for all the $(n+1)^2$ pixels in the square region surrounding (x, y), and then using these to calculate the desired output $$v(\hat{x}, \hat{y}) = \sum_{i=0}^{\eta} \sum_{j=0}^{\eta} a_{ij} \hat{x}^i \hat{y}^j \quad (5)$$

Consider an interim pixel location at $(\hat{x}, y_e)$. Define $b_{ie}$ by:

$$b_{ie} = \sum_{j=0}^{\eta} a_{ij} y_e^j \quad (6)$$

Note that the coefficients $b_{ie}$ depend on the y coordinate $y_e$ but are independent of x. We can now rewrite Equation 4 as:

$$\sum_{i=0}^{\eta} b_{ie} x_k^i = v(x_k, y_e) \quad (7)$$

and Equation 5 for the interim pixel becomes:

$$v(\hat{x}, y_e) = \sum_{i=0}^{\eta} b_{ie} \hat{x}^i \quad (8)$$

Equation 7 and 8 define an nth order one-dimensional polynomial interpolation in x along the row $y = y_e$, to arrive at a value for the interim pixel at $(\hat{x}, y_e)$. It is clear, though, that the value arrived at for this interim pixel by one dimensional interpolation is exactly the value that would be arrived at by the two-dimensional process. This is true for all pixel positions along rows of the old matrix. This can be understood intuitively by noting that for any fixed value of y, Eq. 3 is an nth order polynomial in x, as is the one dimensional model, and if the two agree at $(n+1)$ points along the row, they will agree everywhere along the row.

Suppose that values for interim pixels $(\hat{x}, y_e)$ for the $(n+1)$ rows surrounding the pixel of interest have been calculated by nth order $(n+1)$ polynomial interpolation. Again, the interim pixel values agree with what the full two-dimensional method would have given at those locations. Define $$c_j = \sum_{i=0}^{\eta} a_{ij} \hat{x}^i \quad (9)$$

The set $\{c_j\}$ can be computed by finding the coefficients for which $$\sum_{j=0}^{\eta} c_j y_e^j = v(\hat{x}, y_e) \quad (10)$$

is true for all the interim pixels. Eq. 5 now becomes:

$$v(\hat{x}, \hat{y}) = \sum_{j=0}^{\eta} c_j \hat{y}^j \quad (11)$$

Equations 10 and 11 define one dimensional nth order polynomial interpolation in the y direction along the column defined by the interim pixels and which also contains the output pixel $(\hat{x},\hat{y})$. Again, since both equations 5 and 11 are nth order polynomials and since they agree at $(n+1)$ points (the interim pixels) they must give the same value at $(\hat{x},\hat{y})$. Thus, the two dimensional interpolation can be implemented using simpler one dimensional interpolation steps. Further, it will be clear to those skilled in the art that many of the interim pixel values needed to calculate one output pixel can be stored and used to calculate other output pixels.

We can restrict outselves to dealing with one dimensional interpolation. It will now be shown that the interpolated output value can be calculated as a linear combination of the input pixel values, where the combination coefficients depend on the relative position of the output point with respect to the input points.

We use as a model:

$$f(x) = \sum_{i=0}^{\eta} a_i x^i \qquad (12)$$

Again, the coefficients $a_i$ are arrived at by forcing $$\sum_{i=0}^{\eta} a_i x_k^i = v_k \qquad (13)$$

to be true for the (n+1) pixels surrounding the output location, where $\{x_k\}$ and $\{v_k\}$ are the input pixel locations and values respectively. There are (n+1) equations like Equation 13 which we can write in matrix form:

$$A \cdot X = V \qquad (14)$$

A is a row vector containing the polynomial coefficients, X is a square matrix containing the x values raised to the appropriate powers, and V is a row vector containing the pixel values. We solve for A by:

$$A = V \cdot X^{-1} \qquad (15)$$

and then find the desired output pixel value by $$f(\hat{x}) = A \cdot \hat{X} \qquad (16)$$

where $\hat{X}$ is a column vector containing $\hat{X}$ raised to the appropriate powers. Substituting Equation 15 into Equation 16 and regrouping we get $$f(\hat{x}) = V(X^{-1}\hat{X}) \qquad (17)$$

which shows that the output value is a linear combination of the values of the surrounding input pixels. The combination coefficients are given by $(X^{-1}\hat{X})$ and depend on the relative position of the output pixel within the input array. Once the combination coefficients are known, the interpolation requires (n+1) multiplications and n additions.

If the input pixels are equally spaced, the combination coefficients depend only on the normalized distance of the output pixel from the pixel to its left. We define this normalized distance by:

$$\Delta X = \frac{\hat{x} - x_k}{\Delta p} \qquad (18)$$

where $x_k$ is the pixel location just to the left of $\hat{x}$ and p is the spacing between pixels.

One advantage of using an odd number for the polynomial order n is that the number of input points used for each output point, (n+1), is even. Thus, the input points can be symmetrically located about the output. Following is a derivation of the combination coefficients for a third order interpolation (n=3).

The model for this third order interpolation is:

$$f(\hat{x}) = a_0 + a_1 \Delta X + a_2 (\Delta x)^2 + a_3 (\Delta X)^3 \qquad (19)$$

Since $X_k$ is the pixel location just to the left of $\hat{X}$, the four pixels to be used have values $V_{k-1}$, $V_k$, $V_{k+1}$ and $V_{k+2}$ and their respective X as values are $-1, 0, 1,$ and 2 respectively. Using Equation 19, the four equations used to calculate the polynomial coefficients $a_i$ are:

$$a_0 - a_1 + a_2 - a_3 = V_{k-1} \qquad (20a)$$

$$a_0 = V_k \qquad (20b)$$

$$a_0 + a_1 + a_2 + a_3 = V_{k+1} \qquad (20c)$$

$$a_0 + 2a_1 + 4a_2 + 8a_3 = V_{k+2} \qquad (20d)$$

Equation 20B defines $a_0$. Adding Equations 20a and 20c yields:

$$2a_0 + 2a_2 = V_{k-1} + V_{k+1} \qquad (21)$$

Substituting Equation 20b and regrouping gives an expression for $a_2$:

$$a_2 = \tfrac{1}{2}V_{k-1} - V_k + \tfrac{1}{2}V_{k+1} \qquad (22)$$

Subtracting Equation 20a from Equation 20c gives:

$$2a_1 + 2a_3 = V_{k+1} - V_{k-1} \qquad (23)$$

Substituting Equations 20b and 22 into Equation 20d and regrouping gives:

$$2a_1 + 8a_3 = -2V_{k-1} + 3V_k - 2V_{k+1} + V_{k+2} \qquad (24)$$

Equations 23 and 24 can be solved for $a_1$ and $a_3$:

$$a_1 = -\tfrac{1}{3}V_{k-1} - \tfrac{1}{2}V_k + V_{k+1} - 1/6 V_{k+2} \qquad (25)$$

$$a_3 = -1/6 V_{k-1} + \tfrac{1}{2}V_k - \tfrac{1}{2}V_{k+1} + 1/6 V_{k+2} \qquad (26)$$

Substituting Equations 20b, 22, 25 and 26 into Equation 19 and combining like terms yields:

$$f(x) = Z_1 V_{k-1} + Z_2 V_k + Z_3 V_{k+1} + Z_4 V_{k+2} \qquad (27)$$

where $$Z_1 = -\tfrac{1}{3}(\Delta X) + \tfrac{1}{2}(\Delta X)^2 - 1/6(\Delta X)^3 \qquad (28)$$

$$Z_2 = 1 - \tfrac{1}{2}(\Delta X) - (\Delta X)^2 + \tfrac{1}{2}(\Delta X)^3$$

$$Z_3 = \Delta X + \tfrac{1}{2}(\Delta X)^2 - \tfrac{1}{2}(\Delta X)^3$$

$$Z_4 = -1/6(\Delta X) + 1/6(\Delta X)^3$$

Thus, to perform the cubic interpolation, it is not necessary to solve a system of equations for the polynomial coefficients and then to evaluate the cubic polynomial at the desired location. Instead, the combination coefficients for the four points surrounding the output location can be calculated using Equations 26 and 28 and then used with Equation 27 to calculate the output value.

Even with this method, there are many arithmetic operations involved in the interpolation since there are many operations needed to generate the combination coefficients for a given ($\Delta X$). However, this latter computational burden (the operations involved in generating the coefficients) can be eliminated. This is done by precalculating the coefficients for a set of values of $\Delta x$, and storing these in a table. When coefficients for a particular value of $\Delta x$ are needed, the coefficients for the nearest table entry are used. Alternatively, linear interpolation between table entries could be used.

It has been found that for a particular application cubic interpolation using 128 sets of precalculated combination coefficients performs very well. Following is a table of combination coefficients for cubic interpolation at 128 equally spaced values of $\Delta x$:

WEIGHTING FACTORS

| | | | |
|---|---|---|---|
| 0.000000000 | 1.000000000 | 0.000000000 | 0.000000000 |
| 0.000000000 | 0.992187500 | 0.007812500 | 0.000000000 |
| 0.000000000 | 0.984375000 | 0.015625000 | 0.000000000 |
| -0.007812500 | 0.984375000 | 0.023437500 | 0.000000000 |
| -0.007812500 | 0.976562500 | 0.031250000 | 0.000000000 |
| -0.007812500 | 0.976562500 | 0.039062500 | -0.007812500 |
| -0.007812500 | 0.968750000 | 0.046875000 | -0.007812500 |
| -0.015625000 | 0.968750000 | 0.054687500 | -0.007812500 |
| -0.015625000 | 0.960937500 | 0.062500000 | -0.007812500 |
| -0.015625000 | 0.953125000 | 0.070312500 | -0.007812500 |
| -0.023437500 | 0.953125000 | 0.078125000 | -0.007812500 |
| -0.023437500 | 0.945312500 | 0.085937500 | -0.007812500 |
| -0.023437500 | 0.937500000 | 0.093750000 | -0.007812500 |
| -0.023437500 | 0.937500000 | 0.101562500 | -0.015625000 |
| -0.023437500 | 0.929687500 | 0.109375000 | -0.015625000 |
| -0.031250000 | 0.929687500 | 0.117187500 | -0.015625000 |
| -0.031250000 | 0.921875000 | 0.125000000 | -0.015625000 |
| -0.031250000 | 0.914062500 | 0.132812500 | -0.015625000 |
| -0.031250000 | 0.906250000 | 0.148437500 | -0.023437500 |
| -0.031250000 | 0.898437500 | 0.156250000 | -0.023437500 |
| -0.039062500 | 0.898437500 | 0.164062500 | -0.023437500 |
| -0.039062500 | 0.890625000 | 0.171875000 | -0.023437500 |
| -0.039062500 | 0.882812500 | 0.179687500 | -0.023437500 |
| -0.039062500 | 0.875000000 | 0.187500000 | -0.023437500 |
| -0.039062500 | 0.867187500 | 0.195312500 | -0.023437500 |
| -0.046875000 | 0.867187500 | 0.210937500 | -0.031250000 |
| -0.046875000 | 0.859375000 | 0.218750000 | -0.031250000 |
| -0.046875000 | 0.851562500 | 0.226562500 | -0.031250000 |
| -0.046875000 | 0.843750000 | 0.234375000 | -0.031250000 |
| -0.046875000 | 0.835937500 | 0.242187500 | -0.031250000 |
| -0.046875000 | 0.828125000 | 0.250000000 | -0.031250000 |
| -0.046875000 | 0.820312500 | 0.257812500 | -0.031250000 |
| -0.054687500 | 0.820312500 | 0.273437500 | -0.039062500 |
| -0.054687500 | 0.812500000 | 0.281250000 | -0.039062500 |
| -0.054687500 | 0.804687500 | 0.289062500 | -0.039062500 |
| -0.054687500 | 0.796875000 | 0.296875000 | -0.039062500 |
| -0.054687500 | 0.789062500 | 0.304687500 | -0.039062500 |
| -0.054687500 | 0.781250000 | 0.312500000 | -0.039062500 |
| -0.054687500 | 0.773437500 | 0.320312500 | -0.039062500 |
| -0.054687500 | 0.765625000 | 0.335937500 | -0.046875000 |
| -0.054687500 | 0.757812500 | 0.343750000 | -0.046875000 |
| -0.054687500 | 0.750000000 | 0.351562500 | -0.046875000 |
| -0.054687500 | 0.742187500 | 0.359375000 | -0.046875000 |
| -0.054687500 | 0.734375000 | 0.367187500 | -0.046875000 |
| -0.054687500 | 0.726562500 | 0.375000000 | -0.046875000 |
| -0.062500000 | 0.718750000 | 0.390625000 | -0.046875000 |
| -0.062500000 | 0.710937500 | 0.398437500 | -0.046875000 |
| -0.062500000 | 0.703125000 | 0.406250000 | -0.046875000 |
| -0.062500000 | 0.695312500 | 0.414062500 | -0.046875000 |
| -0.062500000 | 0.687500000 | 0.421875000 | -0.046875000 |
| -0.062500000 | 0.679687500 | 0.437500000 | -0.054687500 |
| -0.062500000 | 0.671875000 | 0.445312500 | -0.054687500 |
| -0.062500000 | 0.664062500 | 0.453125000 | -0.054687500 |

| | | | |
|---|---|---|---|
| −0.062500000 | 0.656250000 | 0.460937500 | −0.054687500 |
| −0.062500000 | 0.648437500 | 0.468750000 | −0.054687500 |
| −0.062500000 | 0.640625000 | 0.476562500 | −0.054687500 |
| −0.062500000 | 0.625000000 | 0.492187500 | −0.054687500 |
| −0.062500000 | 0.617187500 | 0.500000000 | −0.054687500 |
| −0.062500000 | 0.609375000 | 0.507812500 | −0.054687500 |
| −0.062500000 | 0.601562500 | 0.515625000 | −0.054687500 |
| −0.062500000 | 0.593750000 | 0.523437500 | −0.054687500 |
| −0.062500000 | 0.585937500 | 0.531250000 | −0.054687500 |
| −0.062500000 | 0.578125000 | 0.539062500 | −0.054687500 |
| −0.062500000 | 0.570312500 | 0.546875000 | −0.054687500 |
| −0.062500000 | 0.562500000 | 0.562500000 | −0.062500000 |
| −0.054687500 | 0.546875000 | 0.570312500 | −0.062500000 |
| −0.054687500 | 0.539062500 | 0.578125000 | −0.062500000 |
| −0.054687500 | 0.531250000 | 0.585937500 | −0.062500000 |
| −0.054687500 | 0.523437500 | 0.593750000 | −0.062500000 |
| −0.054687500 | 0.515625000 | 0.601562500 | −0.062500000 |
| −0.054687500 | 0.507812500 | 0.609375000 | −0.062500000 |
| −0.054687500 | 0.500000000 | 0.617187500 | −0.062500000 |
| −0.054687500 | 0.492187500 | 0.625000000 | −0.062500000 |
| −0.054687500 | 0.476562500 | 0.640625000 | −0.062500000 |
| −0.054687500 | 0.468750000 | 0.648437500 | −0.062500000 |
| −0.054687500 | 0.460937500 | 0.656250000 | −0.062500000 |
| −0.054687500 | 0.453125000 | 0.664062500 | −0.062500000 |
| −0.054687500 | 0.445312500 | 0.671875000 | −0.062500000 |
| −0.054687500 | 0.437500000 | 0.679687500 | −0.062500000 |
| −0.046875000 | 0.421875000 | 0.687500000 | −0.062500000 |
| −0.046875000 | 0.414062500 | 0.695312500 | −0.062500000 |
| −0.046875000 | 0.406250000 | 0.703125000 | −0.062500000 |
| −0.046875000 | 0.398437500 | 0.710937500 | −0.062500000 |
| −0.046875000 | 0.390625000 | 0.718750000 | −0.062500000 |
| −0.046875000 | 0.375000000 | 0.726562500 | −0.054687500 |
| −0.046875000 | 0.367187500 | 0.734375000 | −0.054687500 |
| −0.046875000 | 0.359375000 | 0.742187500 | −0.054687500 |
| −0.046875000 | 0.351562500 | 0.750000000 | −0.054687500 |
| −0.046875000 | 0.343750000 | 0.757812500 | −0.054687500 |
| −0.046875000 | 0.335937500 | 0.765625000 | −0.054687500 |
| −0.039062500 | 0.320312500 | 0.773437500 | −0.054687500 |
| −0.039062500 | 0.312500000 | 0.781250000 | −0.054687500 |
| −0.039062500 | 0.304687500 | 0.789062500 | −0.054687500 |
| −0.039062500 | 0.296875000 | 0.796875000 | −0.054687500 |
| −0.039062500 | 0.289062500 | 0.804687500 | −0.054687500 |
| −0.039062500 | 0.281250000 | 0.812500000 | −0.054687500 |
| −0.039062500 | 0.273437500 | 0.820312500 | −0.054687500 |
| −0.031250000 | 0.257812500 | 0.820312500 | −0.046875000 |
| −0.031250000 | 0.250000000 | 0.828125000 | −0.046875000 |
| −0.031250000 | 0.242187500 | 0.835937500 | −0.046875000 |
| −0.031250000 | 0.234375000 | 0.843750000 | −0.046875000 |
| −0.031250000 | 0.226562500 | 0.851562500 | −0.046875000 |
| −0.031250000 | 0.218750000 | 0.859375000 | −0.046875000 |
| −0.031250000 | 0.210937500 | 0.867187500 | −0.046875000 |
| −0.023437500 | 0.195312500 | 0.867187500 | −0.039062500 |
| −0.023437500 | 0.187500000 | 0.875000000 | −0.039062500 |
| −0.023437500 | 0.179687500 | 0.882812500 | −0.039062500 |
| −0.023437500 | 0.171875000 | 0.890625000 | −0.039062500 |
| −0.023437500 | 0.164062500 | 0.898437500 | −0.039062500 |

| | | | |
|---|---|---|---|
| −0.023437500 | 0.156250000 | 0.898437500 | −0.031250000 |
| −0.023437500 | 0.148437500 | 0.906250000 | −0.031250000 |
| −0.015625000 | 0.132812500 | 0.914062500 | −0.031250000 |
| −0.015625000 | 0.125000000 | 0.921875000 | −0.031250000 |
| −0.015625000 | 0.117187500 | 0.929687500 | −0.031250000 |
| −0.015625000 | 0.109375000 | 0.929687500 | −0.023437500 |
| −0.015625000 | 0.101562500 | 0.937500000 | −0.023437500 |
| −0.007812500 | 0.093750000 | 0.937500000 | −0.023437500 |
| −0.007812500 | 0.085937500 | 0.945312500 | −0.023437500 |
| −0.007812500 | 0.078125000 | 0.953125000 | −0.023437500 |
| −0.007812500 | 0.070312500 | 0.953125000 | −0.015625000 |
| −0.007812500 | 0.062500000 | 0.960937500 | −0.015625000 |
| −0.007812500 | 0.054687500 | 0.968750000 | −0.015625000 |
| −0.007812500 | 0.046875000 | 0.968750000 | −0.007812500 |
| −0.007812500 | 0.039062500 | 0.976562500 | −0.007812500 |
| 0.000000000 | 0.031250000 | 0.976562500 | −0.007812500 |
| 0.000000000 | 0.023437500 | 0.984375000 | −0.007812500 |
| 0.000000000 | 0.015625000 | 0.984375000 | 0.000000000 |
| 0.000000000 | 0.007812500 | 0.992187500 | 0.000000000 |

In this method of interpolation, then, for a desired output pixel location $\hat{x}$, the first pixel to the left, $x_k$, is identified, $\Delta x$ is calculated using Equation 26 (note that the pixel spacing p is usually normalized to unity so no dimension is necessary), the four combination coefficients for the table entry with a value of $\Delta x$ closest to the calculated value are found, and these coefficients are used along with the values for the four pixels surrounding $\hat{x}$ in Equation 28 to calculate the output value.

Referring again to FIG. 1, a value for the interim pixel 16 is first calculated using $\Delta x$ and the values of the four adjacent old pixels 11, 12, 13, and 14 (for a third order polynomial). Similarly, values for interim pixels 17, 18 and 19 are calculated. A final pixel value is obtained for pixel 15 from the polynomial interpolation along the y-axis using the values of the pixels 15, 17, 18, and 19 and the offset $\Delta y$.

This procedure is illustrated in the computer system of FIG. 2. The new pixel 15 from FIG. 1 is located in the matrix map 20 using the matrix 10 of FIG. 1. The x-offset ($\Delta x$) is located at 22, and the y-offset ($\Delta y$) is located at 24. The interim pixel value is then determined at 26 using the x-offset, $\Delta x$, coefficients from the table of coefficients 28, and the values of the four adjacent pixels. The final pixel value of pixel 15 is obtained at 30 using the interim pixel values 26 and the y-offset, $\Delta y$.

FIG. 3 is a flow diagram of the program for obtaining the interim pixel values and the final pixel values. The new pixel values $x_0$, the x-offset, $\Delta \hat{x}$, and the number of new pixels, n, are provided as inputs along with the old pixel values, IN(j), at 40.

Next, each pixel, k, is taken in turn and the mapped position, $x_0$, is specified. The y/x incremental distance is then determined at 44. Coefficients from the table of coefficients 46 are retrieved and applied in the polynomial equation using the values of the 16 adjacent old pixels as shown in 48 to obtain the interim pixel values. The interim pixel values are then used with the appropriate weighting constants, determined by $\Delta y$, to calculate the new pixel value. The procedure is repeated until all new pixel values are determined.

The described method of calculating image data using polynomial interpolations has been implemented using a data general S140 computer. However, in accordance with one embodiment of the present invention using two multiprocessor sets, or four arithmetic processors, image interpolation has been realized which is four to forty times faster than the single main frame computer.

FIG. 4 is a function block diagram of the embodiment using two multiprocessor sets for operating on odd and even numbered pixels, respectively. The even data set includes a first processor 50 for performing the arithmetic manipulation of the pixel data and calculating final pixel value and a second processor 52 for addressing source image data in a buffer memory 54, addressing the display memory 56, and determining and addressing the weighting constants in memory 58 for use in the arithmetic manipulation. Similar elements are employed in the odd data set as designated by the prime numbers.

In operation, unmagnified (or unminified) image data is generated by a scanning system such as the General Electric CT 9800 computerized tomographic scanning system (not shown) and stored in buffer memories 54 and 54', the two buffers cooperatively storing data for a full image. Data is read from the buffer memories 54, 54' and applied to processors 50, 50' along with the requisite interpolation weighting constants from memories 58, 58' under control of processors 52, 52'. The new data calculated by processors 50, 50' is then stored in the display memories 56, 56' under control of processors 52, 52'. The system then accesses the display memories for display refresh with the odd and even pixel data from the memory being multiplexed at 60 and applied through a digital to analog converter 62 to control display 64.

The embodiment illustrated in FIG. 4 has been implemented using TMS 320 processors for use with the GE CT 9800 system which includes a Z80 microprocessor. The TMS 320 processors operated in accordance with the interpolation algorithm disclosed in copending application Ser. No. 672,609, supra. Attached hereto and incorporated by reference are the program listings for controlling processor 50 and processor 52, respectively.

While the invention has been described with reference to an embodiment including two multiprocessor sets for operating on odd and even pixel data, respectively, the description is illustrative of the invention and is not to be construed as limiting the invention. Obviously greater calculation speed can be realized by employing additional multiprocessor sets for operating on smaller groups of image pixel data. Thus, while the invention has been described with reference to a specific embodiment the description is illustrative of the invention and is not to be construed as limiting the invention. Various modifications and applications may occur to those skilled in the art without departing from the true spirit and scope of the invention as defined by the appended claims.

What is claimed is:

1. Apparatus for use in calculating image data for a spatially varied image using high order polynomial algorithms for pixel interpolation comprising
    a buffer memory for storing first image data,
    a display memory for storing second image data based on interpolations of said first image data,
    a constants memory for storing constants for use in polynomial interpolation,
    a first processor for receiving said first image data from said buffer memory and constants from said constants memory and operating on said first image data in accordance with a polynomial interpolation algorithm, said first processor generating spatially varied image data therefrom for storage in said display memory, and
    a second processor interconnected with said buffer memory, said display memory, said constants memory, and said first processor for controlling the calculating of spatially varied image data.

2. Apparatus as defined by claim 1 wherein said second processor controls the calculating of spatially varied image data by addressing said buffer memory for retrieval of said first image data, addressing said constants memory for selectively retrieving constants for use in said polynomial interpolation algorithm, and addressing said display memory for storage of said spatially varied image data.

3. Apparatus as defined by claim 2 wherein said first image data comprises first pixel data and said second image data comprises pixel data with data for a pixel in said second pixel data being based on interpolations of data for a plurality of pixels in said first image data.

4. For use with scanning apparatus in spatially varying image data generated by the scanning apparatus, apparatus for calculating the spatially varied image data using polynomial interpolations comprising
    a plurality of sets of processing means, each set operating on assigned portions of image data in parallel with other of said plurality of sets,
    each set of processing means including
        a buffer memory for storing first image data,
        a display memory for storing second image data based on interpolations of said first image data,
    a constants memory for storing constants for use in polynomial interpolation,
    a first processor for receiving said first image data from said buffer memory and constants from said constants memory and operating on said first image data in accordance with a polynomial interpolation algorithm, said first processor generating spatially varied image data therefrom for storage in said display memory, and
    a second processor interconnected with said buffer memory, said display memory, said constants memory, and said first processor for controlling the calculating of spatially varied image data.

5. Apparatus as defined by claim 4 wherein said second processor controls the calculating of spatially varied image data by addressing said buffer memory for retrieval of first image data, addressing said constants memory for selectively retrieving constants for use in said polynomial interpolation algorithm, and addressing said display memory for storage of said spatially varied image data.

6. Apparatus as defined by claim 5 wherein said first image data comprises first pixel data and said second image data comprises pixel data with data for a pixel in said second pixel data being based on interpolations of data for a plurality of pixels in said first image data.

7. Apparatus as defined by claim 6 and further including multiplexing means interconnected with said display memories for providing spatially varied image data for a complete image in time ordered sequence.

8. Apparatus as defined by claim 4 and further including multiplexing means interconnected with said display memories for providing spatially varied image data for a complete image in time ordered sequence.

* * * * *

UNITED STATES PATENT AND TRADEMARK OFFICE
CERTIFICATE OF CORRECTION

PATENT NO. : 4,611,348

DATED : September 9, 1986

INVENTOR(S) : Eugene C. Williams; Phil E. Pearson, Jr.

It is certified that error appears in the above—identified patent and that said Letters Patent is hereby corrected as shown below:

Col. 3, line 55 (Equation 5) " $v(\hat{x}, \hat{y})$ " should be --$v(x, y)$--.

Col. 4, line 9, (Equation 8) " $= \sum_{i=0}^{\eta} b_{ie} x^i$ " should be $$-- \sum_{i=0}^{\eta} b_{ie} \hat{x}^i --.$$

Col. 4, line 46 (Equation 11) " $= \sum_{j=0}^{\eta} c_j y^j$ " should be -- $\sum_{j=0}^{\eta} c_j \hat{y}^j$ --.

Col. 6, line 25 (Equation 24) "$2a_1 + 8_3 =$" should be

--$2a_1 + 8a_3 =$ --.

Signed and Sealed this

Ninth Day of December, 1986

Attest:

DONALD J. QUIGG

Attesting Officer    Commissioner of Patents and Trademarks